(12) United States Patent
Remijn et al.

(10) Patent No.: US 11,872,941 B2
(45) Date of Patent: Jan. 16, 2024

(54) REARVIEW MIRROR ASSEMBLY HAVING A MICRO-LED ILLUMINATION SUBASSEMBLY

(71) Applicant: Gentex Corporation, Zeeland, MI (US)

(72) Inventors: Matthew W. Remijn, Grand Rapids, MI (US); Kevin A. Schueler, Grand Haven, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 18/099,005

(22) Filed: Jan. 19, 2023

(65) Prior Publication Data

US 2023/0226976 A1    Jul. 20, 2023

Related U.S. Application Data

(60) Provisional application No. 63/300,824, filed on Jan. 19, 2022.

(51) Int. Cl.
| | | |
|---|---|---|
| *B60R 1/12* | (2006.01) | |
| *B60R 1/08* | (2006.01) | |
| *B60R 1/06* | (2006.01) | |

(52) U.S. Cl.
CPC .......... *B60R 1/1207* (2013.01); *B60R 1/0602* (2013.01); *B60R 1/088* (2013.01)

(58) Field of Classification Search
CPC ...... B60R 1/1207; B60R 1/0602; B60R 1/088
See application file for complete search history.

(56) References Cited

U.S. PATENT DOCUMENTS

| | | | |
|---|---|---|---|
| 5,151,824 A | 9/1992 | O'Farrell | |
| D426,506 S * | 6/2000 | Todd | ............................ D12/188 |
| 6,111,683 A | 8/2000 | Cammenga et al. | |
| 6,111,684 A | 8/2000 | Forgette et al. | |
| 6,166,848 A | 12/2000 | Cammenga et al. | |
| 6,244,716 B1 * | 6/2001 | Steenwyk | ............... B60R 1/088 |
| | | | 359/603 |
| 6,356,376 B1 | 3/2002 | Tonar et al. | |
| 6,426,485 B1 * | 7/2002 | Bulgajewski | .......... H05B 3/845 |
| | | | 219/548 |
| 6,441,943 B1 | 8/2002 | Roberts et al. | |
| (Continued) | | | |

FOREIGN PATENT DOCUMENTS

| | | |
|---|---|---|
| CN | 201235784 Y | 5/2009 |
| KR | 20030097231 A | 12/2003 |

*Primary Examiner* — Bryon T Gyllstrom
(74) *Attorney, Agent, or Firm* — Price Heneveld LLP; Brian James Brewer (57) ABSTRACT

A rearview mirror assembly includes a mirror element including a first substrate having a first surface and a second surface. A reflector is disposed adjacent to one of the first and second surfaces. The rearview mirror assembly further includes a lighting subassembly includes a light source and a diffuser. The light source is operable to project light through the mirror element. The diffuser is disposed between the light source and the mirror element. The light source comprises a plurality of micro light-emitting diodes arranged in a light shape representing a display icon such that the display icon is projected through the mirror element without any influence on the shape caused by any other component of the mirror element.

20 Claims, 9 Drawing Sheets

(56) References Cited

U.S. PATENT DOCUMENTS

| | | | |
|---|---|---|---|
| 6,700,692 B2* | 3/2004 | Tonar | B60Q 1/2665 |
| | | | 257/E33.059 |
| 7,717,596 B1* | 5/2010 | Bell | B60Q 1/381 |
| | | | 362/800 |
| 9,227,557 B2* | 1/2016 | Chen | B60R 1/1207 |
| 9,333,900 B2* | 5/2016 | Arai | B60R 1/1207 |
| 2008/0212189 A1* | 9/2008 | Baur | B32B 17/1022 |
| | | | 362/540 |
| 2012/0206930 A1* | 8/2012 | Minikey, Jr. | B60R 1/12 |
| | | | 362/494 |
| 2012/0235832 A1* | 9/2012 | Takayanagi | B60R 1/06 |
| | | | 340/901 |
| 2017/0092134 A1* | 3/2017 | Kendall | B60R 1/06 |
| 2018/0345846 A1* | 12/2018 | Alisafaee | F21S 43/31 |
| 2021/0291740 A1 | 9/2021 | Lin et al. | |

\* cited by examiner

REARVIEW MIRROR ASSEMBLY HAVING A MICRO-LED ILLUMINATION SUBASSEMBLY

CROSS-REFERENCE TO RELATED APPLICATION

This application claims priority under 35 U.S.C. § 119(e) upon U.S. Provisional Patent Application No. 63/300,824, entitled "REARVIEW MIRROR ASSEMBLY HAVING A MICRO-LED ILLUMINATION SUBASSEMBLY" filed on Jan. 19, 2022, by Kevin A. Schueler et al., the entire disclosure of which is incorporated herein by reference.

TECHNOLOGICAL FIELD

The present disclosure relates generally to a vehicle mirror and, more particularly, relates to lighting assemblies for vehicle mirrors.

BACKGROUND OF THE INVENTION

Outside mirrors having indicia for signaling turns or alerting a driver to vehicles in the driver's blind spot are well known in the art. Side blind zone alert (SBZA) systems often use an icon that appears in the vehicle's side mirror when the system detects a vehicle or other objects in the driver's blind spot. In use, the SBZA system enables the vehicle to detect other vehicles located where they may be difficult for the driver to directly see using the outside mirrors.

When the SBZA system detects a vehicle in the adjacent lane, the system will illuminate a symbol or other indicia on the driver's outside rearview mirror. This alerts the driver to a potential collision. Often, when the driver activates the turn signal in the direction of the detected vehicle, the blind spot alert symbol will flash to better draw the attention of the driver. Otherwise, the symbol remains illuminated until the other vehicle has left the blind zone.

SUMMARY OF THE INVENTION

In one aspect of the invention, a mirror assembly is provided for a vehicle. The rearview mirror assembly includes a mirror element including a first substrate having a first surface and a second surface. A reflector is disposed adjacent to one of the first and the second surfaces. The rearview mirror assembly further includes a lighting subassembly including a light source and a diffuser. The light source is operable to project light through the mirror element. The diffuser is disposed between the light source and the mirror element. The light source includes a plurality of micro light-emitting diodes arranged in a light shape representing a display icon such that the display icon is projected through the mirror element without any influence on the light shape caused by any other component of the mirror element.

According to another aspect, a lighting subassembly is provided for a rearview mirror assembly. The lighting subassembly includes a light source operable to project light through a mirror element of the rearview mirror assembly. The mirror element includes a substrate having a first surface and a second surface. The light source includes a plurality of micro light-emitting diodes arranged in a light shape representing a display icon. A diffuser is disposed between the light source and the mirror element. A substantially light-transmissive layer extends from the diffuser to the second surface to allow the display icon to project through the mirror element without any influence on the light shape caused by any other component of the mirror element.

According to another aspect, a rearview mirror assembly is provided for a vehicle, the rearview mirror assembly including: a mirror element including a first substrate having a first surface and a second surface, and a reflector disposed adjacent to one of the first and second surfaces, wherein the mirror element is an electrochromic mirror element having a variable reflectance; a lighting subassembly including a light source and a diffuser, wherein the light source is operable to project light through the mirror element, wherein the diffuser is disposed between the light source and the mirror element, and wherein the light source comprises a micro light-emitting diode film disposed on a PCB substrate adjacent to the second surface of the mirror element and including a plurality of micro light-emitting diodes arranged in a light shape representing a display icon such that the display icon is projected through the mirror element without any influence on the light shape caused by any other component of the mirror element; and a heating element disposed in the PCB substrate for heating the mirror element.

These and other features, advantages, and objects of the present device will be further understood and appreciated by those skilled in the art upon studying the following specification, claims, and appended drawings.

BRIEF DESCRIPTION OF THE DRAWINGS

The invention will now be described with reference to the following drawings, in which.

DETAILED DESCRIPTION OF EMBODIMENTS

Figure 1:
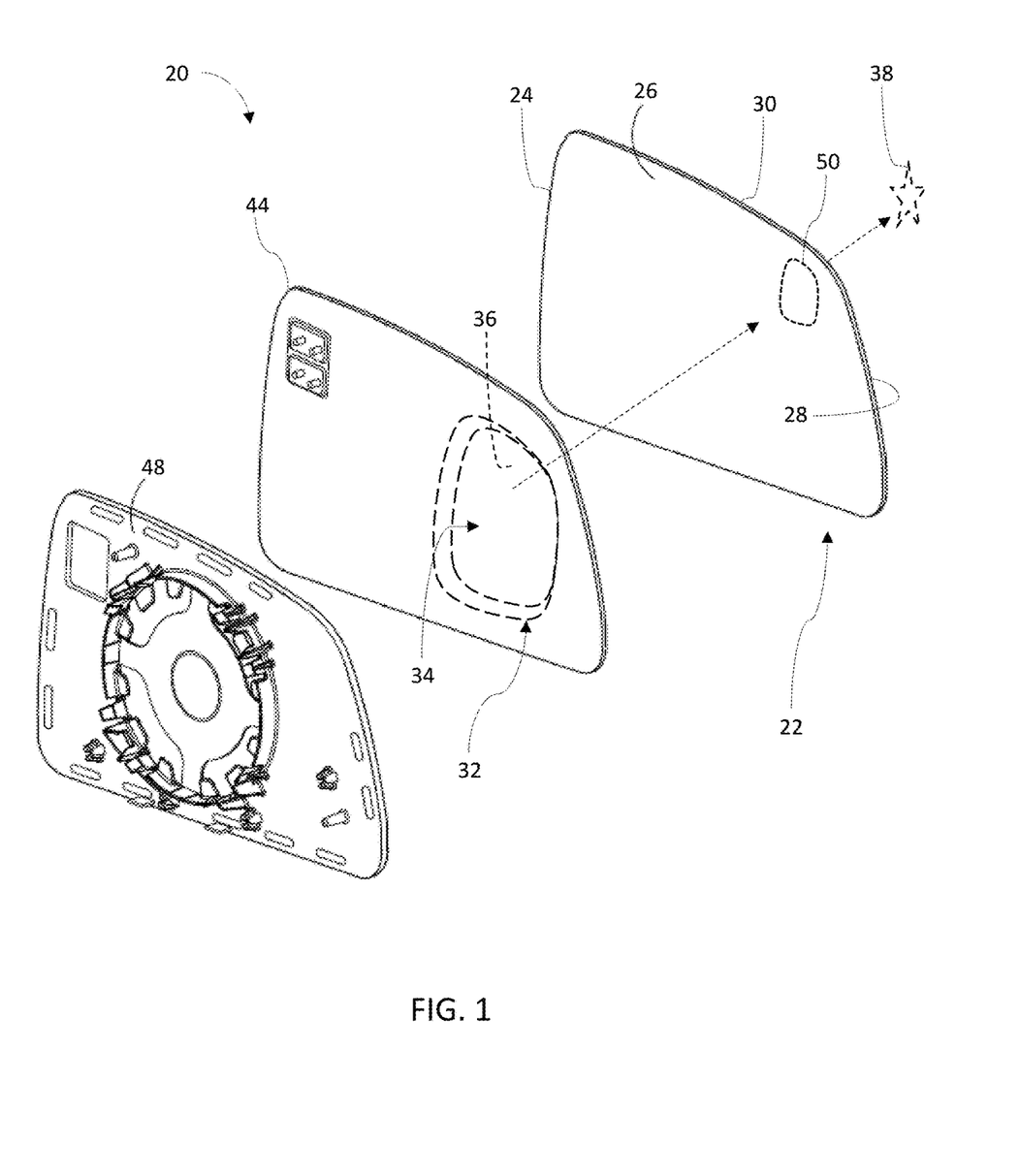
FIG. 1 generally illustrates an exploded perspective view of a side mirror according to one aspect of the present disclosure.

For purposes of description herein, the terms "upper," "lower," "right," "left," "rear," "front," "vertical," "horizontal," and derivatives thereof shall relate to the invention as oriented in FIG. 1. Unless stated otherwise, the term "front" shall refer to the surface of the mirror element closer to an intended viewer of the mirror element, and the term "rear" shall refer to the surface of the mirror element further from the intended viewer. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

As defined herein, "substantially" or "approximately," when used in reference to optical properties (such as light transmissivity) and the like, may, in some embodiments, mean within ten percent of a target state (e.g. 100%). In other embodiments, "substantially" may mean within five percent of the target state. In further embodiments, "substantially" may mean within three percent of the target state. In yet other embodiments, "substantially" may mean within one percent of the target state. By way of example, "opaque" may have a target state of approximately 0% light transmissivity, while "transparent" may have a target state of approximately 100% light transmissivity.

Figure 2:
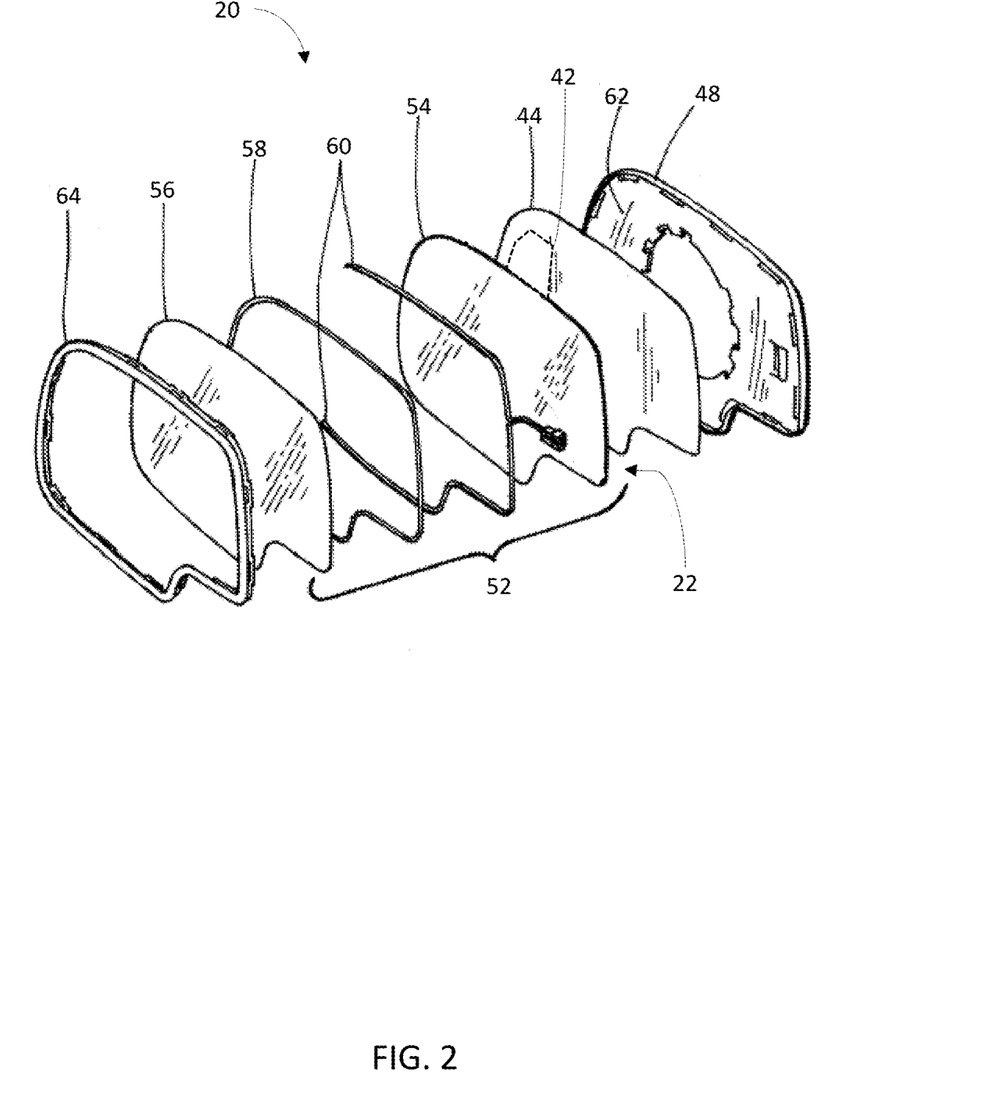
FIG. 2 generally illustrates an exploded perspective view of an electrochromic side mirror.

Referring to FIGS. 1 and 2, an exterior rearview mirror of a vehicle is shown, in which the inventive mirror assembly 20 is implemented. It is generally contemplated that the mirror assembly described herein may also be incorporated into an interior rearview mirror of a vehicle.

The mirror assembly 20 may include a mirror element 22 that includes a first substrate 24 having a first surface 26 and a second surface 28 opposite the first surface 26. The mirror element 20 may further include a reflector 30 that may be disposed adjacent to one of the first and second surfaces 26 and 28. The mirror element 22 may be manufactured of mirrored glass having a fixed reflectance or alternatively an electrochromic (EC) element for varying the reflectance of the mirror. The mirror assembly 20 may include a lighting subassembly 32 that includes a light source 34 and a diffuser 36. The light source 34 may include a plurality of micro light-emitting diodes (mLEDs) arranged in a light shape 38 representing a display icon, such that the display icon is projected through the mirror element 22 without any influence on the light shape 38 caused by any other component of the mirror element 22. The diffuser 36 may be disposed between the light source 34 and the mirror element 22. By configuring the plurality of mLEDs in the shape of the display icon, a masking layer is not required for at least partially blocking the light from the light source 34 to influence the shape of the projected light. As will be described in further detail, the lighting subassembly 32 is used for providing the lighting for illuminating various indicia that do not require cutting and/or etching into the reflector 30 of the mirror element 22, nor a mask, to be formed. The indicia are used typically for driver assist functions of the vehicle including, but not limited to, turn signals, blind spot detection, obstacle detection, lane departure warning (LDW), and the like.

The light source 34 may include an mLED film 42 disposed in a printed circuit board (PCB) substrate 44 (FIG. 2) adjacent to the first surface 26. The PCB substrate 44 may be rigid or flexible. A heating element 46 may be disposed on the PCB substrate 44 for heating the substrate 24. The heating element 46 may be employed for melting ice and/or evaporating condensation or other fluids from the front surface of the mirror element 22. A carrier plate 48 is positioned behind the PCB substrate 44 and is used for attaching the mirror element 22 to a mirror element positioning mechanism (such as the mirror element positioning mechanism 94 (FIG. 4)) within a mirror housing.

The reflector 30 may define an aperture 50. The aperture 50 may be aligned with the diffuser 36 to allow light projected from the lighting subassembly 32 to transmit through the mirror assembly 20 easier (e.g., with minimized reflection). It is generally contemplated that, due to properties of the lighting subassembly 32, the aperture 50 may be omitted. Stated differently, the lighting subassembly 32 may be configured to project light directly through the reflector 30 particularly if the reflector 30 is at least partially transmissive to the wavelengths of light emitted from the mLEDs. The diffuser 36 may abut the reflector 30 or abut an entry of the aperture 50. Alternatively, the diffuser 36 may be spaced from the mirror element 22. In this assembly, there may be no other elements between the diffuser 36 and the mirror element 22 to impede the light projected from the light source 34 (e.g., a continuous space). More specifically, the continuous space may extend from the diffuser 36 to the mirror element 22. Due to the low-profile depth (e.g., 0.1 mm to 1 mm) of the light source 34, such spacing (e.g., a continuous space or direct contact with the mirror element 22 or first substrate 24) may allow the lighting subassembly 32 to be positioned adjacent a front portion of the mirror assembly 20.

Referring now to FIG. 2, the mirror assembly 20, described herein, may be an electrochromic (EC) mirror having at least one EC element 52. The EC mirror element 52 may be retained by the carrier plate 48 by an attachment configuration that optimally co-extensively supports the EC element 52 for minimal image distortion. The EC element 52 may include a first substrate 54 and a second substrate 56 spaced from the first substrate 54 by a seal 58. It is generally contemplated that the first substrate 54 may also include the reflector 30 (not shown in FIG. 2). A clip 60 extends along the top and bottom edges of the first substrate 54. Another clip (not shown) may extend along the top and bottom edges of the second substrate 56. The clips 60 are optimally positioned to be in electrical contact with a layer of transparent conductor(s) and/or reflector electrode, which in turn, is in contact with the EC material disposed between the substrates 54, 56 to provide an evenly distributed electrical voltage potential across EC material. It is generally contemplated that the clips 60 may be in electrical connection with the PCB substrate 44. The PCB substrate 44 may be mechanically/physically supported behind the first substrate 54 on a flat surface 62 of the carrier plate 48. The components of the mirror assembly 20 may be interconnected with one another via several fastening members, such as adhesives, clips, screws, flanges, and various other male/female connection mechanisms. For example, as illustrated, the mirror assembly 20 may include a perimeter bezel 64 that mechanically snap attaches to an edge of the carrier plate 48.

Figure 3:
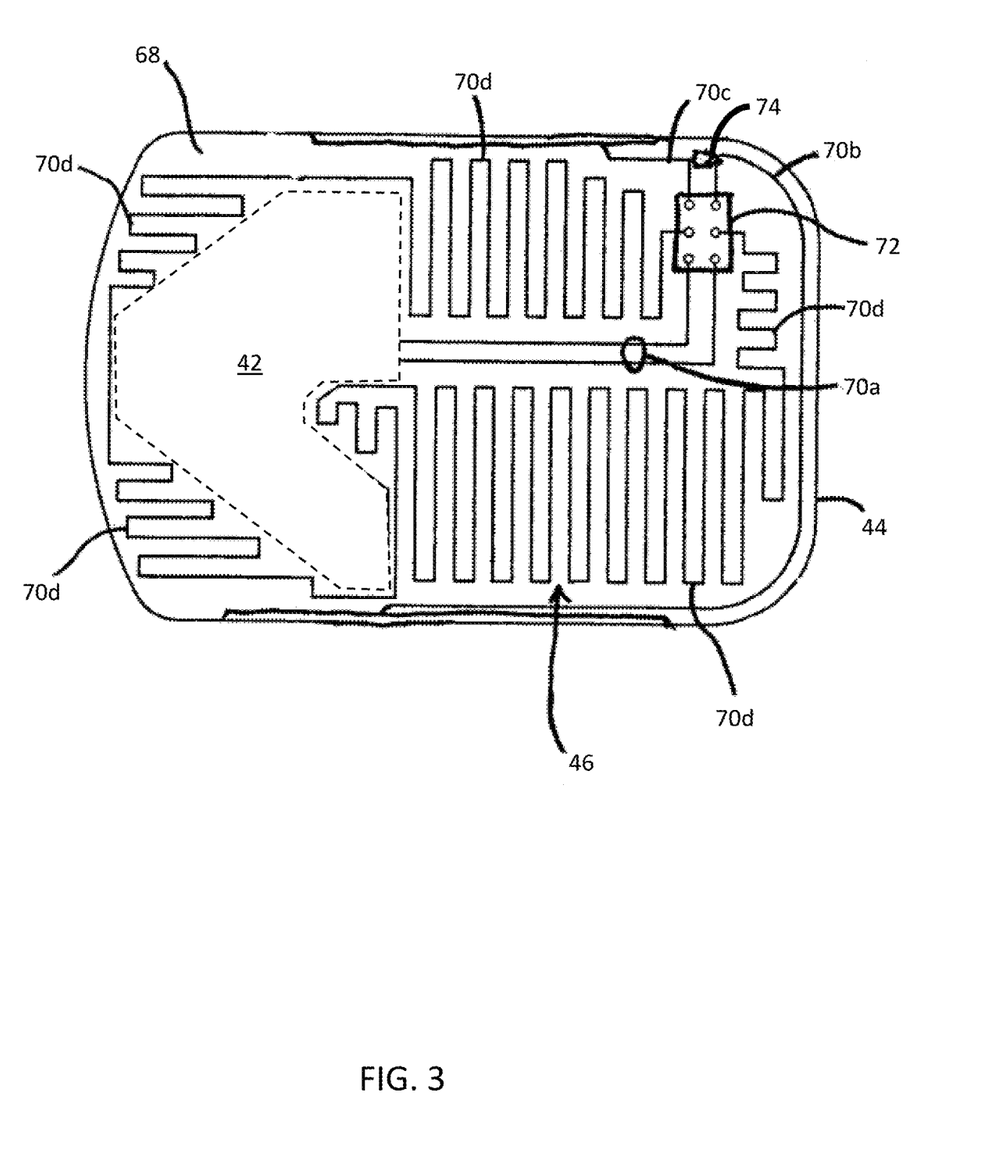
FIG. 3 generally illustrates a front view of a substrate of the mirror assembly illustrated in FIGS. 1 and 2.

Referring now to FIG. 3, a rear detailed view of the PCB substrate 44 is illustrated. More specifically, the PCB substrate 44 is shown with the mLED film 42 being directly mounted to a surface 68 of PCB substrate 44. A plurality of conductive traces 70a-70d may be disposed in or on the PCB substrate 44 for delivering electrical signals to the heating element 46 and the mLED film 42. The mLED film 42 may be electrically connected with conductive traces 70a that are deposited on the surface 68 and extend to a connector terminal 72 to receive power from an external source via a wiring harness 88 (see FIG. 5). Also coupled to the connector terminal 72 are traces 70b and 70c, which may extend to the electrodes of the electrochromic mirror subassembly 52 via, for example, clips 60. A protective diode 74 may be coupled across traces 70b and 70c and mounted directly to the rear surface 68 of substrate 44 to protect the EC element 52 from damage in the event of a reverse polarity coupling.

In at least one embodiment, the mirror heater 46 is provided for improving the operation of the device and for melting frozen precipitation that may be present. Examples of various heaters are disclosed in U.S. Pat. Nos. 5,151,824; 6,244,716; 6,426,485; 6,441,943; and 6,356,376, the disclosures of each of these patents are incorporated in their entireties herein by reference. Preferably, the heater 46 may be formed directly on the surface 68 of PCB substrate 44 by providing numerous serpentine conductive traces 70d having some resistivity. In this way, the traces 70d uniformly heat the mirror element 22 whenever current is passed through the traces.

Figure 4:
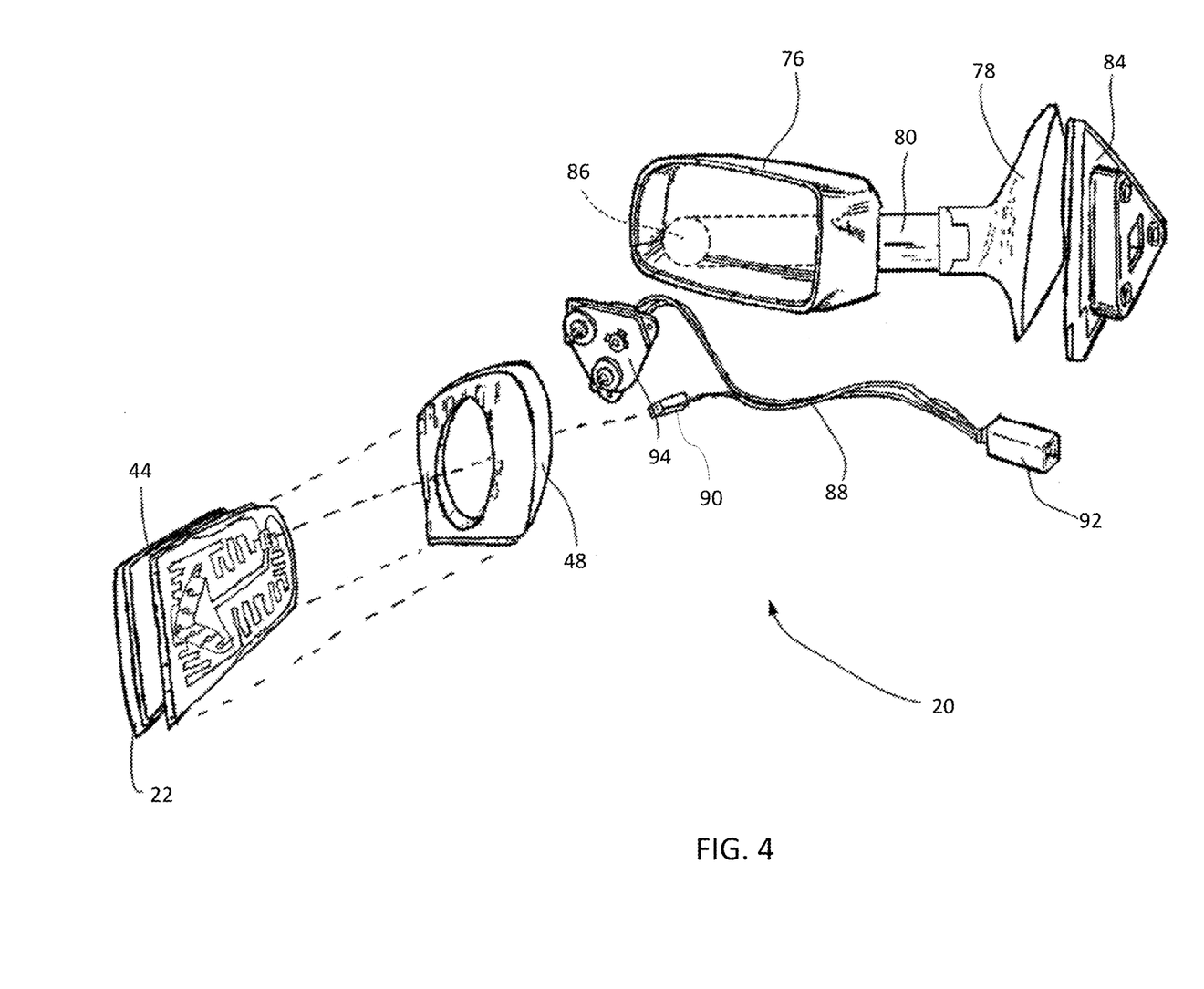
FIG. 4 generally illustrates an exploded perspective view of the side mirror of FIG. 1 illustrated with a wiring harness for the side mirror.

Referring now to FIG. 4, a disassembled view of the mirror assembly 20 in an exterior rearview mirror is shown. The mirror assembly 20 includes a housing 76 connected to an attachment member 78 via an extension 80, which may be telescoping and/or foldable. In at least one embodiment, the extension 80 may include a single arm having a linear actuator for extending and retracting the extension 80 from within the associated vehicle. The extension 80 may comprise a rack and pinion type linear actuator, an electrical solenoid type linear actuator, a pneumatic piston, or a hydraulic actuator. The extension 80 may be configured such that the housing may be folded inward toward the associated vehicle and outward away from the associated vehicle.

The attachment member 78 may be configured to be received by a vehicle mount 84. The vehicle mount 84 may be fixed to a door panel, an A-pillar, a front fender, a window assembly, or any other position where a driver can view the scene generally rearward of the associated vehicle. It should be understood that the telescoping extension 80 may comprise two or more arms and that the housing may be configured to pivot and fold irrespective of the number of arms employed. It should also be understood that the housing 76 may be connected to a non-telescoping extension at a location shown as reference number 80 such that the housing pivots about the connection 88 to be positioned closer or farther from the vehicle as desired. This feature may be accompanied by a power positioning mechanism such that actuation may be performed inside the vehicle. It should be understood that the mirror housing 76, extension 80, and attachment member 78 may be configured such that the telescoping, pivoting, and folding require a manual operation.

A wiring harness 88 with a first end connector 90 and a second end connector 92 is provided to interface the exterior mirror assembly 20 with associated circuitry located inside the vehicle. The first end connector 90 may be configured to plug into or otherwise connect with the connector terminal 72. The second end 92 connector may be configured to plug into or otherwise connect with a terminal within the vehicle to communicate with at least one controller. The wiring harness 88 may be configured to provide extension, folding, and pivoting of the housing 76 and may also be configured to provide reflector control, electrical power, turn signal actuation, mirror heater control, mirror element positioning, light sensor interface, exterior mirror circuit board interface, transceiver interface, information display interface, antenna interface, light source power and control, emergency flasher interface, and all other electrical features as described herein. It should be understood that operator interfaces may be provided within the vehicle for each of these features where appropriate.

A mirror element positioning mechanism 94 is provided for aligning the associated mirror element 22 within the housing 76 from the interior of the vehicle. It should be understood that a corresponding operator interface may be provided within the vehicle for adjusting the position of the mirror element 22. The positioning mechanism 94 is mechanically connected to the carrier 48 for providing a secure structure for supporting and moving the associated mirror element 22. Examples of suitable carriers are described in U.S. Pat. Nos. 6,195,194 and 6,239,899, the disclosures of which are incorporated herein in their entireties by reference.

Figure 5:
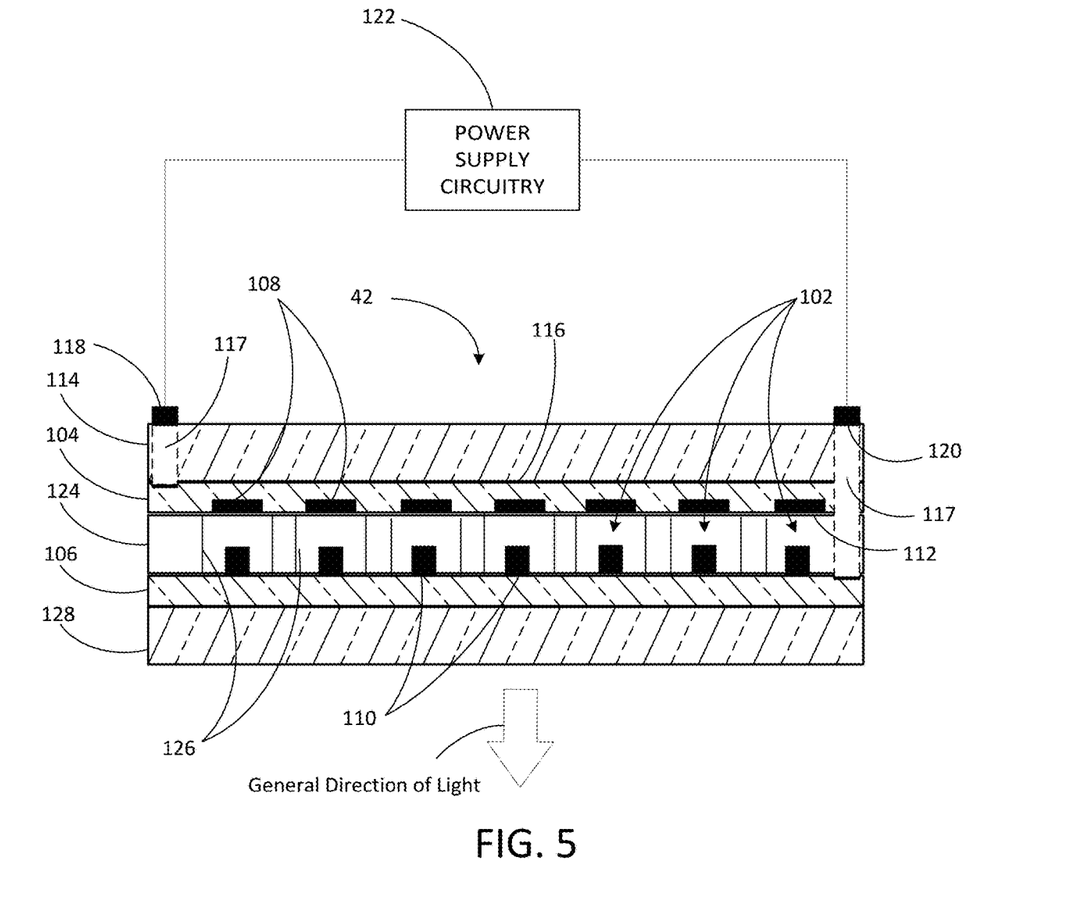
FIG. 5 generally illustrates a cross-sectional view of a micro-LED film for incorporation with the mirror assembly.
Figure 6A:
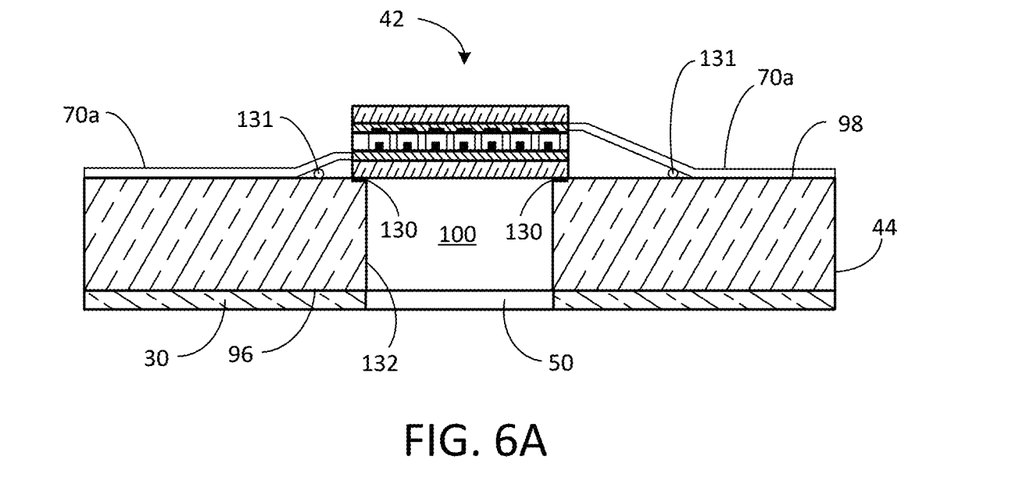
FIG. 6A generally illustrates a cross-sectional view of the mirror element incorporating the micro-LED film of FIG. 5 according to one aspect of the present disclosure.
Figure 6B:
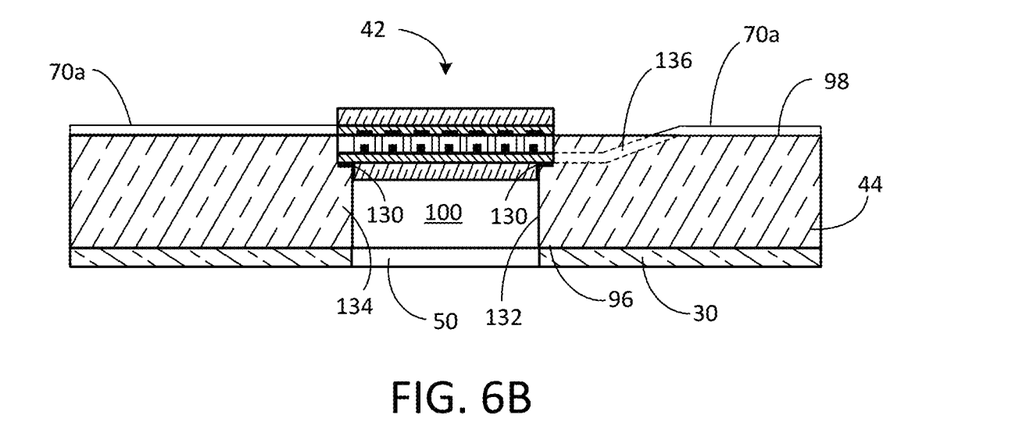
FIG. 6B generally illustrates a cross-sectional view of the mirror element incorporating the micro-LED film of FIG. 5 according to one aspect of the present disclosure.
Figure 6C:
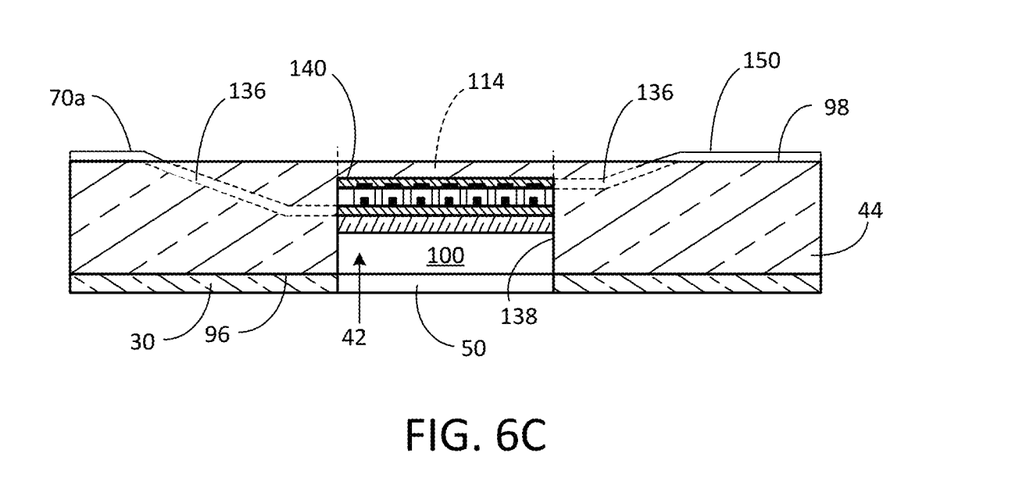
FIG. 6C generally illustrates a cross-sectional view of the mirror element incorporating the micro-LED film of FIG. 5 according to one aspect of the present disclosure.

Referring now to FIGS. 5 and 6A-6C, embodiments of the lighting subassembly 32 are generally illustrated in a stand-alone configuration (FIG. 5) and mounted with the PCB substrate 44 as cross-sectional views (FIGS. 6A-6C). As previously discussed, the lighting subassembly 32 may include mLED film 42 mounted with the PCB substrate 44 and is in electrical communication with conductive traces 70a. The mLED film 42 may be connected with the PCB substrate 44 in a number of ways, but, in general, PCB substrate 44 may be configured either with a cavity (e.g., formed via etching) or without a cavity aligned with the mLED film 42. Stated differently, the mLED film 42 may be either mounted to a front surface of the PCB substrate 44 or a rear surface of the PCB substrate 44 (FIG. 6A), and/or the PCB substrate 44 may define a space 100 in which at least a portion of the mLED film 42 is disposed (FIGS. 6B and 6C).

The mLED film 42 may include microscopic LEDs (micro LEDs, or mLEDs 102) disposed between two flexible conductors 104, 106. Each mLED 102 may include a first electrode 108 (e.g., the cathode) and a second electrode 110 (e.g., the anode). The first electrode 108 may be connected to a first surface 112 of a first conductive layer 104 (e.g., a bottom layer), which is attached to a film substrate 114 on a second, opposing surface 116 of the first conductive layer 104. The film substrate 114 may be formed of polycarbonate, PET, Mylar, or another polymer sheet or thin metal film, paper, or other material. The film substrate 114 may be between 25 and 50 microns in depth. The film substrate 114 may include conductive tracings 117 disposed on and/or tunneling through the film substrate 114. The conductive tracings 117 may include a first node 118 and a second node 120 connected with power supply circuitry 122. The power supply circuitry 122 may be operable to produce an electrical potential (via, e.g., a DC power supply) across the first and second nodes 118, 120. Each mLED 102 in the mLED film 42 may connect to the first and second nodes 118, 120, such that the mLEDs 102 may be parallel.

To provide a vast number of connections to the mLEDs 102 (e.g., hundreds or thousands), the first and second nodes 118, 120 may extend along outer edges of the mLED film 42. The tunneling of one or both of the nodes 118, 120, may allow the cathode/anode 108, 110 to have electrical connection at a different depth of the mLED film 42. In other words, because the mLED film 42 is a layered structure that may require electrical communication at upper and lower layers of the structure 42, the tunnels 117 may allow the first or second nodes 118, 120 to extend along the depth of the mLED film 42 to connect with the cathode or anode 108, 110.

Atop the first conductive layer 104 may be a dielectric layer 124. The dielectric layer 124 may be printed on the first conductive layer 104 in a predefined pattern that leaves a plurality of voids 126 formed therein. The mLEDs 102 are disposed in the voids 126 (e.g., a semiconductor die), with the top of the mLEDs 102 (e.g., the anodes 110) exposed generally flush with or slightly above the dielectric layer 124. This allows a second conductive layer 106 to be electrically connected with the anode 110 of each mLED 102 once the second conductive layer 106 is printed or otherwise disposed over the dielectric layer 124. The second conductive layer 106 may be transparent and be comprised of indium tin oxide (ITO). The first conductive layer 104 (e.g., the cathode), which may be considered the "bottom electrode" in relation to the side of the mLED film 42 that light passes through (as illustrated by the hollow arrow in FIG. 5), may be comprised of a similar or different material. For example, the bottom electrode 104 may be a printed aluminum layer, a laminated aluminum film, or a silver nano-wire layer that is flexible. In general, the conductive layers 104, 106 may be flexible and substantially transparent (e.g., over 95 percent transmissive). The mLED film 42 may include a diffuser 128 disposed on an opposing side of the film substrate 114 (e.g., on top of the second conductive layer 106). The diffuser 128 may be a phosphor layer that is laminated over the second conductive layer 106.

Referring now to FIGS. 6A-6C, the mLED film 42 may be connected to the back surface 98 of the PCB substrate 44 via an adhesive connection 130 about a periphery of the mLED film 42 or otherwise fastened to the substrate via plastic or metal fasteners (e.g., clips, zip-ties, screws, bolts, etc.). As illustrated in FIG. 6A, the adhesive 130 may be employed between the diffuser 128 and the PCB substrate 44 to secure the mLED film 42 to the PCB substrate 44. It is generally contemplated that the mLED film 42 may be ultrasonically welded or otherwise melded with the PCB substrate 44 by applying heat to the junction of the mLED film 42 and the PCB substrate 44. As previously stated, the mLED film 42 may be fastened to the PCB substrate 44 in any conceivable means, such as via two-sided, transparent tape, for example. The PCB substrate 44 may define a hole 132 aligned with the mLED film 42 and the aperture 50 to allow the light to pass through the mirror element 22. The mLED film 42 may receive electrical power from the power supply circuitry 122 via the electrical traces 70a or via a separate electrical connector, as previously discussed in reference to FIG. 4. The electrical traces 70a may be elevated from or soldered with another conductor that is elevated from the back surface 98 via spacers 131 of the PCB substrate 44 to electrically connect with the conductive layers 104, 106.

Because the mLEDs 102 and the heating element 46 may be operated via separate circuits, advantages of using the traces 70a-70d on the PCB substrate 44 to power the mLEDs 102 may be moot when the mLED film 42 is not at least partially embedded in the PCB substrate 44. Although the mLED film 42 is illustrated as positioned on the back surface 98 of the PCB substrate 44, it is generally contemplated that the mLED film 42 may alternatively be positioned on the front surface 96 of the PCB substrate 44 with adhesive connection between the film substrate 114 and the front surface 96. In this embodiment, the space 100 may be omitted, as light may freely project toward the front of the mirror assembly 20. Alternatively, the space 100 may be eliminated if the mLED film 42 is mounted on the back surface 98 and the PCB substrate 44 is either entirely transparent or transparent in the region of space 100.

Referring now to FIG. 6B, the mLED film 42 is illustrated partially embedded in the PCB substrate 44. The substrate 44 may include protruding portions 134 that interpose one or more layers of the mLED film 42. In this configuration, the diffuser 128 may be substantially flush with the front surface 96 of the PCB substrate 44 or have an outer surface that is recessed in the PCB substrate 44, as shown. The adhesive 130 may be positioned between the second conductor 106 and an intermediary surface formed within the hole 132, as shown. The conductive traces 70a may extend into passages 136 defined by the PCB substrate 44. As illustrated, the passages 136 may allow one or more of the flexible conductors 104, 106 to receive electrical connection to the conductive traces 70a. For example, one conductive trace 70a may extend through the passage 136 to contact the second flexible conductor 106, and another conductive trace 70a may remain on the back surface 98 of the substrate 44 and connect with the first flexible conductor 104.

Referring now to FIG. 6C, the mLED film 42 is illustrated as fully embedded in the PCB substrate 44. In this configuration, the diffuser 128 may be inset (as shown) or substantially flush with the front surface 96 of the PCB substrate 44, similar to the configuration set forth in FIG. 6B. Alternatively, the diffuser 128 may protrude slightly from the front surface 96 of the PCB substrate 44. The hole 132 may not extend through a thickness of the PCB substrate 44, but rather form a partially closed cavity 138 having a recessed surface 140 on which the film substrate 114 is disposed. As illustrated in FIG. 6C, the film substrate 114 may be integral with the PCB substrate 44. Although illustrated as a continuous backplate, integration of the PCB substrate 44 and the film substrate 114 may be created via welding or adhesive connection along the dashed lines illustrated in FIG. 6C.

Figure 7:
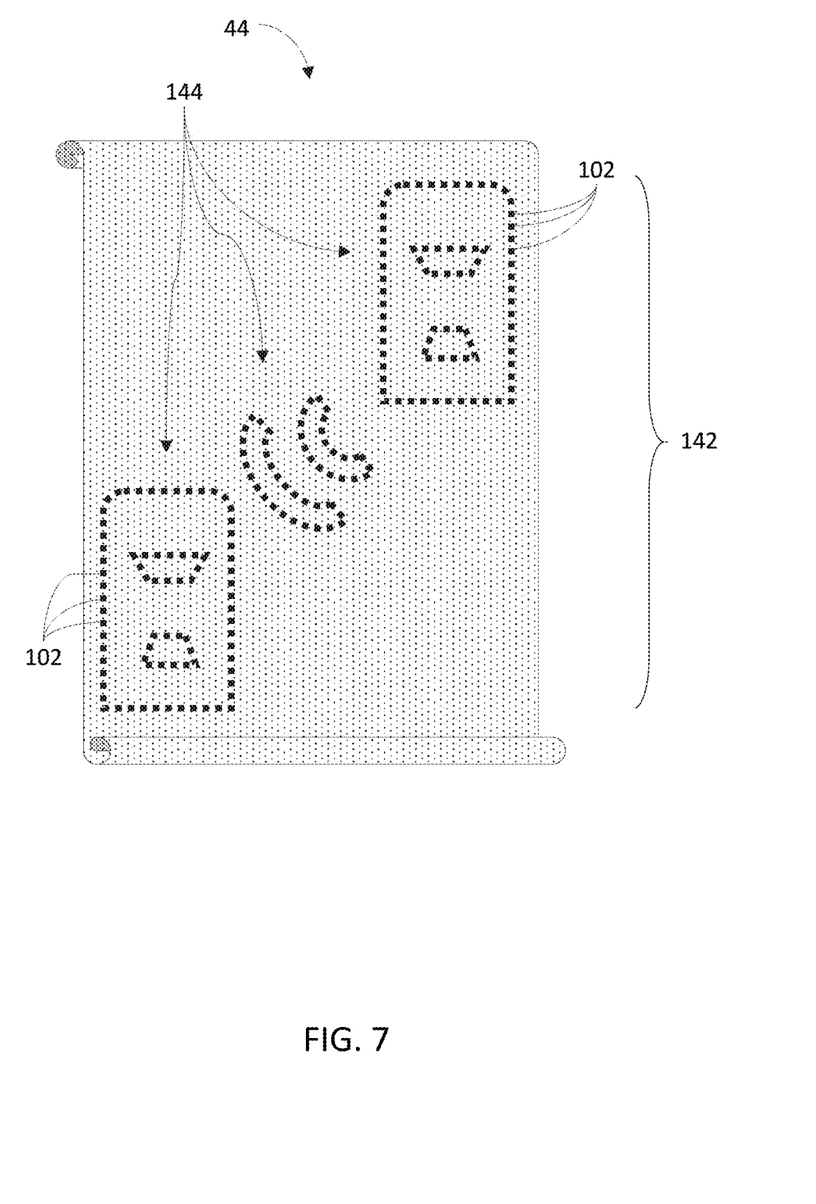
FIG. 7 generally illustrates a front view of the micro-LED film of FIG. 5 forming a blind-spot indicator icon.
Figure 9:
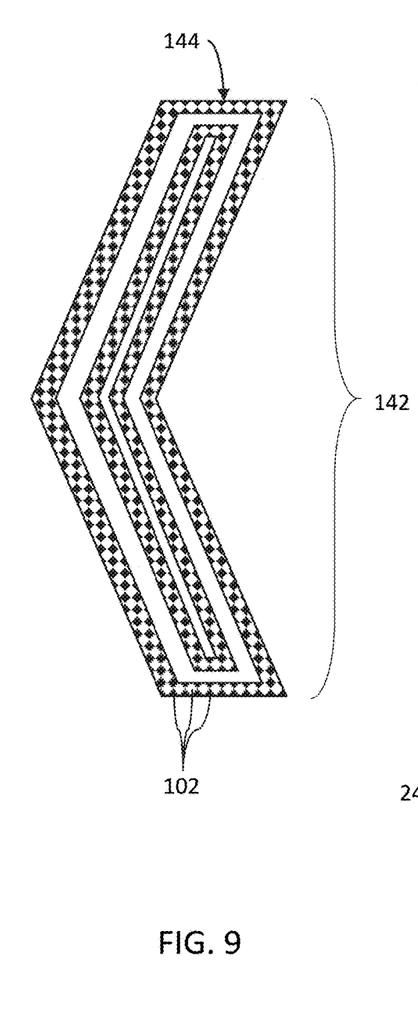
FIG. 9 generally illustrates a front view of the micro-LED film of FIG. 5 forming a turn signal icon.
Figure 10:
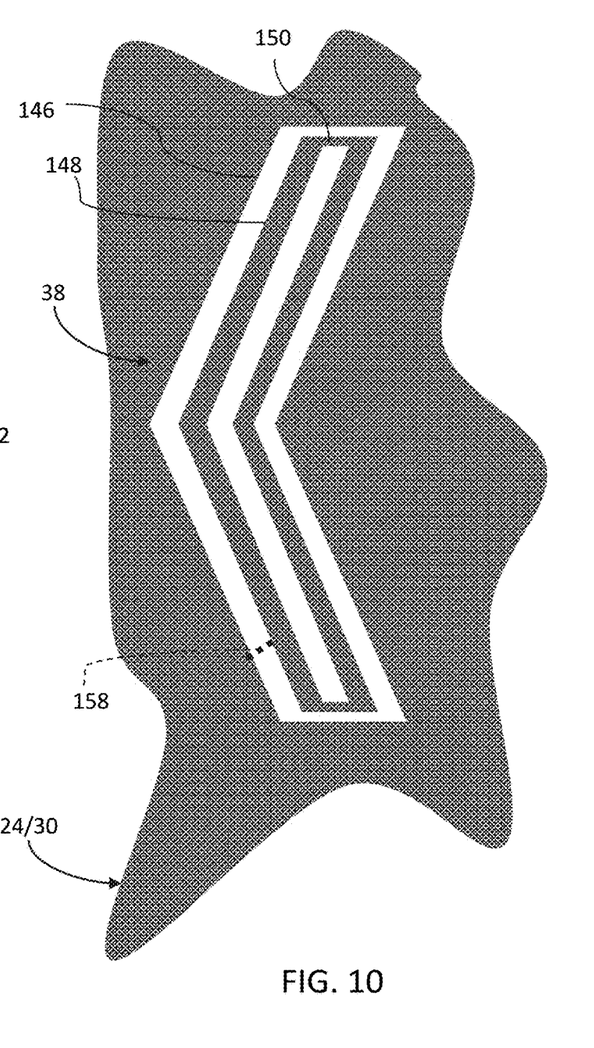
FIG. 10 generally illustrates a fragmentary view of a mirror element of FIG. 1 displaying the turn signal icon of FIG. 9.

In general, the mLED film 42 may have a thickness of between 120 and 330 microns. The mLEDs 102 may have a diameter of less than 50 microns and a height less than 10 microns. The distribution of the mLEDs 102 may be in a randomized pattern or structured to a particular shape. The mLEDs 102 may be arranged in an array 142 having an array shape 144 that corresponds to the light shape 38 (FIG. 1). For example, as illustrated in FIG. 7, the mLED array 142 may be shaped as a blind-spot indicator icon (e.g., a first vehicle and a second vehicle with indicia showing sensor detection). Another example illustrated in FIG. 9 is a light shape 38 forming a turn signal indicator icon. Generally, the light shape 38 generated may be related to an event that calls for a driver's attention to an event taking place in the cabin or outside of the vehicle. For example, the light shape 38 may be a vehicle approach indicator. The shapes formed from the mLEDs 102 may be continuous and, as discussed later in view of FIGS. 7-10, may not require a masking layer disposed between the mLED film 42 and the mirror element 22 or require any other component that may influence the shape of the display icon.

It is generally contemplated that the mLED film 42 may have a paper-like or fabric-like constitution. For example, the mLED film 42 may be configured to fold substantially in half without exceeding the Young's modulus of the mLED film 42. Although illustrated in the figures as approximately half or a third of the thickness of the PCB substrate 44, the thickness of the mLED film 42 may be significantly less than the thickness of the PCB substrate 44 (e.g., 10 to 100 times lesser). For example, the thickness of the mLED film 42 may be between 0.1 and 0.3 mm, whereas the thickness of the PCB substrate 44, which may or may not incorporate the whole of the mLED film 42, may be in the range of 1 to 1.5 mm. Generally, the reflector 30/PCB substrate 44 assembly may have a thickness of approximately 1.5 mm according to some aspects of the present disclosure.

Figure 8:
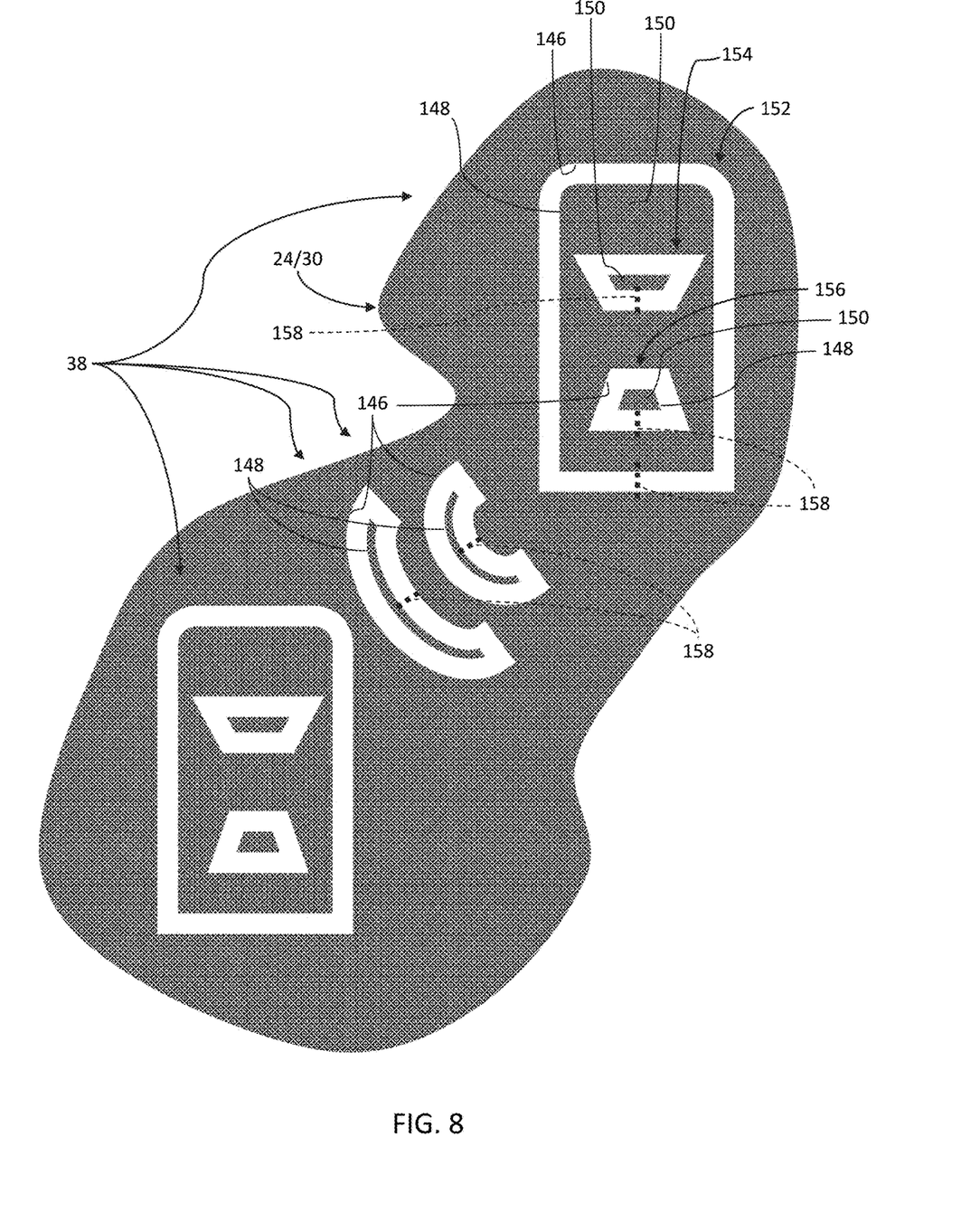
FIG. 8 generally illustrates a fragmentary view of the mirror element of FIG. 1 displaying the blind-spot indicator icon of FIG. 7.

Referring more generally to FIGS. 7-10, various aspects of the mLED film 42 are illustrated in reference to the mLEDs 102 and light shapes 38 formed from the mLEDs 102. More specifically, FIGS. 7 and 9 illustrate mLED arrays 144 forming the example light shapes 38 in FIGS. 8 and 10, respectively. Non-illuminated portions of the mLED film 42 shown in FIG. 7 are omitted in FIG. 9 for clarity, but it is generally contemplated that the mLED array 142 may be formed on the mLED film 42. As illustrated, in FIG. 7, the mLED array 142 may be distributed amongst bare portions of the mLED film 42 where mLEDs 102 are omitted. Each array shape 144 formed by the mLEDs 102 may be configured to form a light shape 38 with an exterior boundary 146 and a continuous interior boundary 148. In this way, the light shapes may have non-illuminated portions 150 that are bounded by the light shape 38. The interior boundary 148 may be separated from (i.e., not having a continuous edge with) the exterior boundary 146. For example, the mLED array 142 may have a first set of mLEDs 152 corresponding to a top view of an outer profile of a vehicle. The mLED array 142 may also include a second set of mLEDs 154 corresponding to a top view of a windshield of the vehicle and a third set of mLEDs 156 corresponding to a top view of a rear window of the vehicle. The second and third sets 154, 156 may be bounded by the first set 152, as illustrated. The resulting light shape 38, as shown in FIG. 8, therefore may produce the non-illuminated portions 150 and the continuous inner boundary 148. In this way, connection portions (e.g., bridging portions 158) may not be required to extend between the non-illuminated portions 150 to support the non-illuminated portions 150 as would be the case if a mask were employed.

Although some light shapes 38 may be attainable via traditional masking methods (e.g., placing a mask 40 in front of a light source 34 to form the light shape 38), continuously bounded interior shapes 148, like the light shapes 38 formed from the first and second sets 152, 154 of mLEDs 102 may require complex masking techniques. For example, traditional masking may typically include an opaque portion defining holes that allow light to project through the masking. But to attain a non-illuminated portion 150 disposed within an illuminated portion, the opaque portion may traditionally include a bridging portion 158. Stated differently, a single mask layer 40 may require a continuous opaque portion. Although complex masking methods could be employed (i.e., suspending the masking layer 40 in a transparent material to attain two disjointed opaque portions), such masking techniques may not be required according to aspects of the present disclosure due to the flexibility and illumination properties of the mLED film 42.

For example, the mLED film 42 may allow the mLEDs 102 to directly, via the diffuser 128, form the light shape 38. Due to the narrow thickness of the mLED film 42 and low profile of the diffuser 128, the light shapes 38 may be generated with no masking layer between the mLED film 42 and the reflector 30. Further, due to these features, the mLED film 42 may be integrated with the heating element 46 and therefore be positioned adjacent to the reflector 30 or rear of the mirror element 22. Because of the close proximity of the diffuser 128 and/or the light source 34 to the reflector 30, an additional benefit may be the increased intensity of the light at the reflector 30.

It is generally contemplated that the mLEDs 102 may be various colors and an mLED film 42 may be configured to provide connection and control over each color. For example, some mLEDs 102 may be configured to illuminate red (i.e., approximately between 620 and 750 nm wavelength), some may be configured to illuminate green (i.e., approximately 550 nm wavelength), and some may be configured to illuminate blue (i.e., approximately between 450 and 495 nm wavelength). In this configuration, additional electrical connections (e.g., additional conductive traces 72a) may be required to connect with the mLED film 42. Although the mLEDs 102 may be configured to operate in visible light spectrum, infrared (IR) and near-IR mLEDs may be provided in the mLED film 42 to project IR light toward a driver of the vehicle. The IR light may be operable to illuminate features of a driver's face for a camera disposed in or outside of the vehicle for capturing image data. The image data may be processed in a driver monitoring system controller to determine the identity of the driver and/or determine a fatigue of the driver (e.g., determine whether the driver's eyes are closed).

It is generally contemplated that some or all of the lighting subassembly 32 (including mLED film 42) may be separately provided from the heating element 46. For example, the PCB substrate 44 may provide a window behind which the lighting subassembly 32 is aligned, similar to the space 100 illustrated in FIGS. 6A-6C. In this configuration, the mLED film 42 may still directly produce the light shape 38 that is formed on the exterior of the mirror assembly 20 (e.g., on the side mirror). As described previously, the assembly of the mLED film 42 may reduce the overall mirror element depth to approximately 1.5 millimeters. By incorporating low-profile LEDs (such as the mLEDs 102), unique plastic tooling for forming specific lighting modules may be unnecessary. Further, because the mLED film 42 may be entirely encapsulated by a polymeric layer, the light source 34 (e.g., the mLEDs 102) may be protected from environmental conditions that could present condensation or contaminates in the lighting subassembly 32 and cause damage to the lighting subassembly 32.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above are merely for illustrative purposes and not intended to limit the scope of the device, which is defined by the following claims as interpreted according to the principles of patent law, including the Doctrine of Equivalents.

What is claimed is:

1. A rearview mirror assembly for a vehicle, the rearview mirror assembly comprising:
   a mirror element including a first substrate having a first surface and a second surface, and a reflector disposed adjacent to one of the first and second surfaces; and
   a lighting subassembly including a light source and a diffuser, wherein the light source is operable to project light through the mirror element, wherein the diffuser is disposed between the light source and the mirror element, and wherein the light source comprises a plurality of micro light-emitting diodes arranged in a light shape representing a display icon such that the display icon is projected through the mirror element without any influence on the light shape caused by any other component of the mirror element.

2. The mirror assembly of claim 1, wherein the lighting subassembly includes a micro light-emitting diode film disposed on a PCB substrate adjacent to the second surface of the mirror element.

3. The mirror assembly of claim 2, further comprising:
   a heating element disposed in the PCB substrate for heating the mirror element.

4. The mirror assembly of claim 1, wherein the mirror element is an electrochromic mirror element having a variable reflectance.

5. The mirror assembly of claim 1, wherein the reflector defines an aperture, and the diffuser is aligned with the aperture.

6. The mirror assembly of claim 1, wherein the light shape includes an exterior boundary and a continuous interior boundary, wherein the continuous interior boundary defines a non-illuminated inner portion of the light shape.

7. The mirror assembly of claim 1, further comprising a continuous space extending from the diffuser to the mirror element.

8. The mirror assembly of claim 1, wherein the diffuser abuts the mirror element.

9. The mirror assembly of claim 1, wherein the light shape includes a continuous illuminated portion completely surrounding a non-illuminated portion.

10. The mirror assembly of claim 9, wherein the light shape further includes a second illuminated portion surrounded by the non-illuminated portion.

11. A lighting subassembly for a rearview mirror assembly having a mirror element including a substrate having a first surface and a second surface, the lighting subassembly comprising:
    a light source operable to project light through the mirror element, the light source comprises a plurality of micro light-emitting diodes arranged in a light shape representing a display icon;
    a diffuser disposed between the light source and the mirror element; and
    a substantially light-transmissive layer extending from the diffuser to the second surface to allow the display icon to project through the mirror element without any influence on the light shape caused by any other component of the mirror element.

12. The lighting subassembly of claim 11, wherein the micro light-emitting diodes are provided in a micro light-emitting diode film disposed on a PCB substrate.

13. The lighting subassembly of claim 12, further comprising:
    a heating element disposed in the PCB substrate for heating the mirror element.

14. The lighting subassembly of claim 11, wherein the light shape includes an exterior boundary and a continuous interior boundary, wherein the continuous interior boundary defines a non-illuminated inner portion of the light shape.

15. The lighting subassembly of claim 11, wherein the diffuser abuts the mirror element.

16. The mirror lighting subassembly of claim 11, wherein the light shape includes a continuous illuminated portion completely surrounding a non-illuminated portion.

17. The mirror assembly of claim 16, wherein the light shape further includes a second illuminated portion surrounded by the non-illuminated portion.

18. A rearview mirror assembly for a vehicle, the rearview mirror assembly comprising:
    a mirror element including a first substrate having a first surface and a second surface, and a reflector disposed adjacent to one of the first and second surfaces, wherein the mirror element is an electrochromic mirror element having a variable reflectance;
    a lighting subassembly including a light source and a diffuser, wherein the light source is operable to project light through the mirror element, wherein the diffuser is disposed between the light source and the mirror element, and wherein the light source comprises a micro light-emitting diode film disposed on a PCB substrate adjacent to the second surface of the mirror element and including a plurality of micro light-emitting diodes arranged in a light shape representing a display icon such that the display icon is projected through the mirror element without any influence on the light shape caused by any other component of the mirror element; and
    a heating element disposed in the PCB substrate for heating the mirror element.

19. The mirror assembly of claim 18, wherein the light shape includes a continuous illuminated portion completely surrounding a non-illuminated portion.

20. The mirror assembly of claim 19, wherein the light shape further includes a second illuminated portion surrounded by the non-illuminated portion.

* * * * *